United States Patent [19]

Arendt

[11] Patent Number: 5,096,879

[45] Date of Patent: Mar. 17, 1992

[54] SYNTHESIS OF BI-CA-SR-CU-O SUPERCONDUCTIVE MATERIAL

[75] Inventor: Ronald H. Arendt, Schenectady, N.Y.

[73] Assignee: General Electric Company, Schenectady, N.Y.

[21] Appl. No.: 399,197

[22] Filed: Aug. 28, 1989

[51] Int. Cl.$^5$ .................... C01B 13/32; C01F 11/02; C01G 29/00; C01G 3/02
[52] U.S. Cl. ........................................ 505/1; 505/782; 505/729; 505/742; 501/126; 501/123; 252/521; 423/593
[58] Field of Search ................................... 505/782, 1

[56] References Cited

U.S. PATENT DOCUMENTS

| | | | |
|---|---|---|---|
| 4,152,281 | 5/1979 | Arendt et al. | |
| 4,534,956 | 8/1985 | Arendt et al. | |
| 4,942,152 | 7/1990 | Itozaki et al. | 204/192.24 |
| 5,039,653 | 8/1991 | Jackson et al. | 505/1 |

OTHER PUBLICATIONS

Schneemeyer et al, "Growth of Superconducting Single Crystals in the Bi—Sr—Ca—Cu—O System from Alkali Chloride Fluxes", *Nature* vol. 332, Mar. 31, 1988 pp. 422-424.

Katsui et al, "Solution Growth of Bi—Si—Ca—Cu—O Compounds Using Alkali Chlorides", *Journal of Crystal Growth* 91(1988) 261-263.

Balestrine et al, "Growth of Textured Film of $Bi_2Si_2CaCu_2O_{8x}$ from RCl Solution", *Appl Phys Lett* 54(20), 15 May 1989 pp. 2041-2042.

Chen et al, "Evaporation Kinetics of a Halide Flux System for the Growth of Bi—Si—Ca—Cu—O Superconductor Crystals", *Jour Crystal Growth* 96(1989) 547-551.

*Primary Examiner*—Mark L. Bell
*Assistant Examiner*—C. Melissa Bonner
*Attorney, Agent, or Firm*—James Magee, Jr.; James C. Davis, Jr.

[57] ABSTRACT

A mixture comprised of an alkali chloride solvent and reactants comprised of bismuth sesquioxide, calcium oxide, strontium oxide and copper oxide, or precursors therefor, wherein the reactants are formulated to produce a superconducting reaction product, is heated to melt the chloride solvent in which the reactants then dissolve and react precipitating a Bi-Ca-Sr-Cu-O superconductive material which is comminuted to produce a sinterable powder.

5 Claims, No Drawings

SYNTHESIS OF BI-CA-SR-CU-O SUPERCONDUCTIVE MATERIAL

The following U.S. patents and applications are assigned to the assignee hereof and are incorporated herein by reference:

Ser. No. 227,840, filed Aug. 3, 1988, for R. H. Arendt for "Synthesis of Lanthanum-Alkaline Earth-Copper-Oxygen Superconductive Material".

U.S. Pat. No. 4,201,760 to Arendt et al. for "Molten Salt Synthesis of Lithium Meta-Aluminate Powder" discloses a process of forming a mixture of alkali chloride solvent salt, a lithium salt reactant selected from the group consisting of lithium hydroxide, lithium nitrate, lithium carbonate and mixtures thereof, and an aluminum salt reactant selected from the group consisting of aluminum hydroxide, alpha-alumina, gamma-alumina and mixtures thereof and heating said mixture to melt the chloride salt solvent in which the lithium and aluminum salt reactants dissolve and react precipitating lithium meta-aluminate.

Ser. No. 010,747, filed Feb. 9, 1979, for Arendt et al. for "Magnesium Aluminum Spinel", now abandoned, discloses a process of forming a mixture of magnesium oxide, aluminum oxide and alkali chloride salt solvent and heating said mixture to melt the chloride salt solvent in which the magnesium oxide and aluminum oxide dissolve and react precipitating magnesium aluminate.

Ser. No. 011,100, filed Feb. 12, 1979, for Arendt et al. for "Magnesium Chrome Spinel", now abandoned, discloses a process of forming a mixture of magnesium oxide, chromium oxide and alkali chloride salt solvent and heating said mixture to melt the chloride salt solvent in which the magnesium oxide and chromium oxide dissolve and react precipitating magnesium chromite.

U.S. Pat. No. 4,234,558 to Arendt et al. for "Molten Salt Synthesis of Orthorhombic Lead Metaniobate Powder" discloses a process of forming a mixture of lead oxide, niobium pentoxide and alkali chloride salt solvent and heating said mixture to melt the chloride salt solvent in which the lead oxide and niobium pentoxide dissolve and react precipitating orthorhombic lead metaniobate.

U.S. Pat. No. 4,234,436 to Arendt et al. for "Molten Salt Synthesis of Modified Alkali Niobate Powders" discloses a process of forming a mixture of niobium pentoxide, an oxide of sodium, potassium, or mixtures thereof, an oxide of lead, cadmium or mixtures thereof, and alkali chloride salt solvent, and heating said mixture to melt the chloride salt solvent in which all of the oxides dissolve and react precipitating modified alkali niobate.

U.S. Pat. No. 4,234,557 to Arendt et al. for "Molten Salt Synthesis of Alkali Niobate Powders" discloses a process for forming a mixture of niobium pentoxide, an oxide of an alkali selected from the group consisting of sodium, potassium, lithium and mixtures thereof, and alkali chloride salt solvent, and heating said mixture to melt the chloride salt solvent in which the niobium oxide and alkali oxide dissolve and react precipitating the alkali niobate.

U.S. Pat. No. 4,233,282 to R. H. Arendt for "Molten Salt Synthesis of Barium and/or Strontium Titanate Powder" discloses a process of forming a particulate mixture of an alkali chloride solvent salt, titanium oxide and an alkaline earth reactant selected from the group consisting of barium oxide, strontium oxide, and mixtures thereof, and heating the mixture to melt the chloride salt solvent in which the titanium oxide and alkaline earth reactant dissolve and react precipitating a titanate selected from the group consisting of barium titanate, strontium titanate and mixtures thereof.

The present invention relates to the preparation of powdered oxide superconductive materials in the system bismuth-calcium-strontium-copper-oxygen.

The conventional preparation of these superconductive materials is either the solid-state reaction of an intimate mixture of the particulate oxides, or compounds which yield them on heating, or the co-precipitation of the cations in intimate mixture as some salt that yields the oxides on subsequent heating to facilitate compound formation. Both processes are, in fact, controlled by solid-state transport, the first being over far greater distances than the latter. This transport mechanism is relatively slow; it is, therefore, difficult to achieve complete reaction in finite times. The second procedure has the added penalty of requiring the processing of large volumes of aqueous solutions, which greatly increases the cost of preparing large quantities of material.

The present invention circumvents the inadequacies of the conventional processes by substituting for the solid state reaction, a liquid phase reaction scheme utilizing a molten salt solvent with subsequent precipitation of the product. In the present process, the reactants are slightly soluble in the molten salt solvent, therefore allowing literally atomic mixing in the liquid phase of the reactants. The solubilities of the reactants are such that they exceed the corresponding solubilities determined by the solubility product of the product in the molten salt solvent. Hence, the reaction product precipitates spontaneously from the molten salt solution. The reactants will continually dissolve to maintain a reactant-saturated solution until they are totally consumed by product formation. The product is separated from the cooled solidified mixture by dissolution of the chloride salt phase in water.

The present process is directed to producing a sinterable powder with a composition which makes it superconductive. This powder has a composition represented by the formula $Bi_2CaSr_2Cu_2O_x$, where x ranges from about 7.5 to about 8.5, and preferably x is about 8.0. Preferably, the powder has a zero resistance transition temperature, i.e. a temperature at which there is no electrical resistance, greater than about 70K, more preferably greater than about 75K, and frequently it ranges from about 75K to about 85K.

Briefly stated, the present process for producing the sinterable superconductive powder of the given $Bi_2CaSr_2Cu_2O_x$ composition comprises providing particulate bismuth sesquioxide or precursor therefor, providing particulate calcium oxide or precursor therefor, providing particulate strontium oxide or precursor thereof, providing particulate copper oxide or precursor therefor, said oxides or precursors therefor being formulated to produce said superconductive composition, providing an alkali chloride solvent selected from the group consisting of sodium chloride, potassium chloride and combinations thereof, forming a mixture of said oxides and/or precursors therefor and said alkali chloride solvent, heating said mixture to a reaction temperature at least sufficient to melt said chloride solvent, each said precursor decomposing at or below said reaction temperature to form said oxide and by-product gas, said alkali chloride solvent in molten form being a solvent for said oxides, maintaining said reaction temperature continuously dissolving said oxides and/or precursors therefor in the resulting molten chloride solvent and continuously reacting the oxides dissolved in said molten chloride solvent thereby precipitating material of said superconductive composition, said alkali chloride solvent being present in an amount at least sufficient to carry out the production of said superconductive material, cooling the resulting reacted mass to solidify the molten chloride salt, adding water to the resulting solidified mass dissolving the alkali chloride, recovering said precipitated superconductive material, and comminuting said material to produce said sinterable superconductive powder.

In carrying out the present process, the reactant oxides are used in amounts which will produce the superconductive powder of desired composition and such amounts are determinable empirically. Preferably, the copper oxide is cupric oxide or substantially cupric oxide.

Alternatively, if desired, particulate inorganic precursors of the reactant oxides can be used. The precursor should decompose at or below reaction temperature and may dissolve in the molten chloride solvent and decompose therein. The precursor should decompose completely to form the oxide and by-product gas or gases leaving no contaminants in the reacted mass. Representative of the precursors of the reactant oxides useful in the present process are the carbonates, hydroxides and nitrates. The precursor should be used in an amount sufficient to produce the respective oxide in the desired amount. Preferably, the carbonate is used as the source of the alkaline earth oxide, i.e. calcium oxide or strontium oxide. Generally, at reaction temperature the alkaline earth carbonate along with any alkaline earth oxide formed by its partial decomposition, continuously dissolve in the molten chloride solvent where the carbonate decomposes to form the oxide.

The reactant oxides or precursors therefor should be of a size which allows the reaction to take place. Generally, these reactants or precursors therefor are used and are satisfactory in the particle size range in which they are available commercially, which ordinarily ranges from submicron up to about 100 microns. The reactant powders preferably also are free of large, hard aggregates, i.e. significantly above 100 microns in size, which might survive the mixing process and prevent sufficient reactant contact for satisfactory reaction rates.

In the present process, the alkali chloride salt, i.e. solvent, is selected from the group consisting of sodium chloride, potassium chloride and mixtures thereof. The alkali chloride is used in an amount at least sufficient to carry out the production of the superconductive powder, i.e. an amount which in molten form is at least sufficient for the oxides to dissolve and react therein to precipitate the superconductive material. Such amount of alkali chloride is determined empirically. Generally, the alkali chloride is used in an amount ranging from about 10% by weight to about 50% by weight, preferably about 20% by weight, of the total amount of reactant oxides and alkali chloride. Generally, amounts of the alkali chloride lower than about 10% by weight are not practical since the desired reaction may not proceed. Since the present superconductive material dissolves slowly in water at room temperature, amounts of chloride salt higher than about 50% by weight are not desirable since they require significantly more water and time to be dissolved away thereby resulting in significant loss of superconductive material.

The reactants or precursors therefor and the alkali chloride salt solvent are admixed to produce a reaction mixture which is sufficiently uniform to carry out the present reaction and precipitate the superconductive material. Preferably, the mixture is substantially uniform to insure good contact and complete reaction. The actual mixing operation can be carried out in several conventional ways which have no significant deleterious effect on the components and which do not introduce undesirable impurities into the resulting product. When calcium and strontium carbonates are used, preferably the components are wet milled in distilled water at room temperature and the resulting slurry is dried in air, preferably above 100° C. Because the oxides of calcium and strontium are hygroscopic, if either of these oxides is used, preferably the components are dry milled to form the reaction mixture. Preferably, zirconia milling media are used.

In a preferred embodiment, a preformed combined Ca-Sr-Cu-oxide product is produced and is used as the reactant oxide of calcium, strontium and copper. Generally, this product contains at least a significant amount of reacted oxides, or a solid solution of the oxides, and frequently combinations thereof.

In carrying out the preferred embodiment, a particulate mixture of calcium carbonate, strontium carbonate and copper oxide is produced which preferably is significantly or substantially uniform, and which frequently ranges in size from submicron to about 20 microns, preferably having an average particle size which is submicron. The mixture can be produced by conventional techniques which have no significant deleterious effect on the components. Preferably, the components are wet milled at room temperature in distilled water, preferably with zirconia milling media, and then dried in air. The resulting mixture is fired in air at about atmospheric pressure at a temperature at least sufficient to decompose the carbonates but not so high as to form liquid. Generally, firing temperature ranges from greater than about 850° C. to less than about 950° C., and preferably it is about 925° C. Firing is carried out at least until no significant amounts of the carbonates remain. In this firing, the carbonates decompose to their respective oxides and generally react with themselves and the copper oxide to form oxide compounds and/or combine to form solid oxide solutions, as dictated by the thermodynamics of the chemical system. Preferably, the resultant combined Ca-Sr-Cu-oxide product is furnace cooled to room temperature. Generally, the oxide product contains no significant amounts of the individual oxides of calcium, strontium or copper.

The combined Ca-Sr-Cu oxide product is admixed with bismuth sesquioxide and alkali chloride to produce a mixture which is sufficiently uniform to carry out the present reaction. Preferably, the mixture is substantially uniform to insure good contact and complete reaction. The mixture can be produced in a conventional manner which has no significant deleterious effect on the components, and preferably, it is produced by dry milling the components with zirconia milling media. The components of the resulting reaction mixture should be of a size which allows the reaction to take place and generally range from submicron up to about 100 microns.

The reaction mixture can be contained in a conventional ceramic crucible which is stable in the present process such as alumina.

The mixture is heated to reaction temperature. The minimum reaction temperature is the temperature at which the chloride salt or salt mixture melts, i.e. the temperature at which it is molten. In molten form, the present chloride salt is a solvent for the reactant oxides. Preferably, the reaction temperature is at least about 10K above the melting point, i.e. liquidus temperature, of the chloride solvent, since such higher temperature insures complete melting of chloride salt and also increases the fluidity of the molten salt producing increased wetting of the reaction mixture. The particular reaction temperature used depends largely on the chloride salt used and the reaction rate desired, i.e. rate of precipitation of the superconductive material desired. Generally, the higher the reaction temperature, the faster is the reaction rate. For sodium chloride alone, the melting point or liquidus temperature is about 1073K (800° C.) whereas for potassium chloride alone it is about 1063K (790° C.). All mixtures of sodium chloride and potassium chloride form a mixture which melts at a temperature below the melting point of sodium chloride alone and thus, for the eutectic mixture of 50 mole % potassium chloride - 50 mole % sodium chloride the minimum reaction temperature is 931K (658° C.). The maximum reaction temperature is always below the melting point of the superconductive material being precipitated, and generally it is below about 900° C. The reaction temperature should be kept below the temperature at which the chloride salt vaporizes significantly. Particularly preferred is a reaction temperature ranging from about 1073K (800° C.) to about 1123K (850° C.) since it is not difficult to maintain and provides high reaction rates without significant vaporization of the molten salt solvent.

At reaction temperature the chloride salt melts and the reactant oxides dissolve and react in the molten salt precipitating the superconductive material. Preferably, the reaction temperature is maintained until the reaction of the reactants present is completed. Generally, when there is a stoichiometric, or slightly below stoichiometric, amount of bismuth sesquioxide relative to the stoichiometric composition of the superconductor, i.e. when the reaction of the reactants present is completed and there is no bismuth sesquioxide remaining, the maximum reaction temperature is just below the melting point of the superconductive material. Generally, however, when there is an excess of bismuth sesquioxide relative to the stoichiometric composition of the superconductor, i.e. when the reaction of the reactants present is completed and there is an excess of bismuth sesquioxide remaining, the maximum reaction temperature is just below the melting point of bismuth sesquioxide which is just below about 820° C. The particular period of reaction time depends largely on reaction temperature as well as the amount of chloride salt used and is determinable empirically.

Preferably, the reaction temperature in the present process is that required to attain reasonable reaction rates in the molten salt solvent, but it can be significantly lower than in the corresponding conventional solid state synthesis. Similarly, the reaction time can be as short as about 20 hours or shorter compared with up to weeks for solid state reaction. When the reaction is completed, the reaction mass is allowed to solidify. It is cooled at any convenient rate, preferably in air and preferably to about room temperature, i.e. a temperature generally ranging from about 15° C. to about 35° C.

The present process can be carried out in air at or about atmospheric pressure.

The cooled reacted mass is generally a solid cake comprised of material of the superconductive composition distributed in a matrix of solidified chloride salt. The superconductive material is present as a distinct second phase generally embedded in the salt matrix. The resulting solidified material is disintegrated with water to yield the superconductive material and an aqueous solution of the chloride salt. More specifically, water, preferably distilled or deionized to prevent introduction of impurities, is added to the solid reacted mass in an amount at least sufficient to dissolve away the chloride salt content therefrom. Preferably, the water is at about or below room temperature to minimize dissolving the superconductive material. The solubility of the present chloride salt is about 0.3 kilogram per liter of water at room temperature. This dissolution of the chloride preferably is carried out in a plastic vessel, and as a practical matter with mixing to substantially shorten dissolution time, using, for example, a motor driven plastic or stainless steel stirrer. As the chloride salt dissolves, the mass disintegrates leaving the superconductive material generally in the form of aggregates of platey crystals, or a mixture of aggregates and individual crystals. Preferably, dissolution of the chloride salt is completed in less than 45 minutes. The superconductive crystalline material is then collected, washed and dried.

The superconductive material can be recovered from the aqueous supernatant chloride solution by a number of conventional techniques. Preferably, contact time of the superconductive material with water is minimized. Preferably, the superconductive material is collected on a filter by vacuum filtration. It is then washed with distilled or deionized water, preferably at about or below room temperature, to remove remaining chloride leaving no significant amount thereof, and preferably collected on a filter. The resulting material is then preferably washed with an alcohol or ketone at about room temperature to displace the water leaving no significant amount thereof. Generally, the alcohol or ketone has a boiling point of less than 100° C. Preferably, the alcohol or ketone has a high vapor pressure at room temperature and preferably it is methanol or acetone. Preferably, the resulting washed material is dried in air at about atmospheric pressure or under vacuum, at about room temperature.

Generally, the aggregates in the resulting superconductive material are comprised of a cluster of smaller sized platelet crystals weakly bonded together autogeneously, i.e. such bonding is believed to be caused by Van der Waal's forces or by self-bonding, i.e. neck growth between grains.

The superconductive material is comminuted to produce the present superconductive powder of sinterable size. Conventional comminuting techniques can be used which have no significant deleterious effect on the resulting powder. Preferably, the superconductive material is milled in an organic liquid in which it is inert or substantially inert, i.e. with which it does not react. Preferably, the organic liquid is non-aqueous or contains no significant amount of water. Also, preferably, the organic liquid has a boiling point of less than 100° C., and preferably it is hexane. Preferably, milling is carried out at about room temperature and zirconia milling media is used. The resulting superconductive powder can be collected in a conventional manner.

Preferably, the slurry is separated from the milling media. The resulting slurry is dried in a manner which has no significant deleterious effect thereon. Preferably, it is dried in a dry gas with which it does not react, or does not react to any significant extent. Conveniently, the dry gas is nitrogen, air, or mixtures thereof. By a dry gas herein, it is meant a gas containing 100 parts per million water or less. Drying can be carried out at about atmospheric pressure or under a partial vacuum. Preferably, drying is carried out at a temperature ranging from about 15° C. to about 45° C.

The present superconductive powder is a sinterable powder. Generally, it is comprised of individual grains, i.e. platelet crystals, having an average size in their longest dimension ranging up to about 10 microns and frequently their average size in the longest dimension is less than about 2 microns. Generally, the present superconductive powder is free-flowing.

The present superconductive powder can be prepared free of impurities or free of significant impurities. Therefore, when the same procedure is used, its properties are reproducible from batch to batch.

Conventional ceramic processing techniques can be used to form the present powder into a polycrystalline superconductive sintered body. Specifically, the present superconductive powder may be pressed into green bodies of desired size and shape and sintered in a known manner at temperatures below its melting point, generally ranging from about 820° C. to 870° C. in air at about atmospheric pressure and cooled rapidly in air at about atmospheric pressure to produce sintered bodies generally having a zero resistance temperature higher than 70K. Such sintered bodies would be useful as superconducting devices such as, for example, a magnetic shield at low temperatures.

The invention is further illustrated by the following example:

EXAMPLE 1

A particulate mixture comprised of 100.09 grams of calcium carbonate, 295.26 grams of strontium carbonate and 159.08 grams of cupric oxide was wet milled in a two liter polyethylene jar with 3200 grams of ⅜ inch diameter dense zirconia media using distilled water as the milling fluid and a few drops of an organic material sold under the trademark Triton as a dispersant for three hours at room temperature.

The resulting slurry was separated from the zirconia media and dried in air in an oven at from about 120° C. to 150° C.

The resulting powdered material had an average particle size which was submicron. It was placed in shallow, high density, high purity alumina ceramic boats to form a low bulk density powder bed roughly 1.0 to 1.5 cm in depth in each boat. Loose fitting alumina lids were placed on the boats.

The material was heated in air at about atmospheric pressure to 750° C. at a rate of 100° C. per hour to protect the alumina boats from thermal shock, then to 925° C. at a rate of 10° C. per hour. It was maintained at 925° C. for 48 hours and then furnace cooled to room temperature. X-ray diffraction analysis of the resultant product showed that the carbonates had completely decomposed to their respective oxides and that these oxides had reacted with themselves and the cupric oxide to form compounds and had also combined to form solid solutions. No appreciable amounts of the individual oxides was detected.

Two aliquots of the composition comprised of 95.10 grams of the resulting Ca-Sr-Cu-oxide product, 103.85 grams of bismuth sesquioxide and 50 grams of alkali chloride salt were dry-milled in a 500 ml polyethylene jar with 1600 grams of ⅜ inch diameter dense zirconia media for 45 minutes at room temperature. The salt was comprised of NaCl-50 mol % KCl and comprised about 20% by weight of the total amount of oxides and chloride present. The milled material was separated from the media on a Nylon screen and placed in a high density, high purity alumina boat to form a low bulk density powder bed. A loose fitting alumina lid was placed on the boat.

The material was reacted by heating it to 850° C. at a rate of 100° C. per hour, maintained at 850° C. for 44 hours, then furnace cooled to room temperature, all in air at about atmospheric pressure.

The superconductive product was in the form of crystalline aggregates intermixed with the solidified alkali chloride solvent. It was retrieved by dissolving the alkali chlorides in distilled water, assuming a salt solubility of 20 g/100 ml; a period of 30 minutes was allowed for this process. The particulate superconductor, now free of the alkali chlorides, was collected on a filter, washed at room temperature with ten 300 ml aliquots of distilled water, and, finally, two 300 ml aliquots of absolute methanol. The superconductive material was finally air dried on the filter at room temperature at atmospheric pressure.

The superconductivity of the aggregate powder was determined by a conventional technique, i.e. the AC Susceptibility Technique. This technique comprised using the powder as an active element in a L-C resonance circuit and measuring the resonance frequency as a function of the circuit's temperature. The transition temperature is that at which there is a larger than background increase in the resonant frequency.

The powder was determined to have a zero resistance transition temperature of about 73K.

X-ray diffraction analysis of the superconductive aggregate powder showed it to be phase pure $Bi_2CaSr_2Cu_2O_x$. From other work, it was known that x was about 8.

EXAMPLE 2

The superconductive aggregate powder produced in Example 1 was annealed at 800° C. in air at about atmospheric pressure for 24 hours. It was then pulled out of the furnace and rapid cooled in air to room temperature in about 10 minutes.

The zero resistance transition temperature of this annealed powder was determined in the same manner as disclosed in Example 1 and found to be 82K.

X-ray diffraction analysis of the annealed powder showed it to have the same composition as disclosed in Example 1.

EXAMPLE 3

The procedure and materials used in this example were the same as disclosed in Example 1 except as noted herein.

107.00 grams of bismuth sesquioxide were used.

The resulting dry-milled material was reacted by heating it to 800° C. at a rate of 100° C. per hour, maintained at 800° C. for 24 hours, then furnace cooled to room temperature, all in air at about atmospheric pressure.

The resulting superconductive aggregate powder was determined to have a zero resistance transition temperature of about 74.3K.

X-ray diffraction analysis of the superconductive aggregate powder showed it to be phase pure $Bi_2CaSr_2Cu_2O_x$. From other work, it was known that x was about 8.

EXAMPLE 4

The superconductive aggregate powder produced in Example 3 was annealed at 800° C. in air at about atmospheric pressure for 24 hours. It was then pulled out of the furnace and rapid cooled in air to room temperature in about 10 minutes.

The zero resistance transition temperature of this annealed powder was determined in the same manner as disclosed in Example 1 and found to be 82K.

X-ray diffraction analysis of the annealed powder showed it to have the same composition as disclosed in Example 3.

EXAMPLE 5

This is a paper example.

The superconductive aggregate powder produced in Example 1 is wet-milled in hexane at room temperature for 30 minutes using zirconia milling media The resulting slurry is separated from the zirconia media and dried at room temperature in an atmosphere of nitrogen containing less than 50 parts per million water.

The resulting superconductive powder is a sinterable powder comprised of platey crystals having an average size in the longest dimension of less than 2 microns.

The powder is compressed into a compact, sintered at 860° C. and cooled rapidly to room temperature, all in air at about atmospheric pressure.

The resulting sintered body has a zero resistance transition temperature of 73K and a porosity of less than 20%.

What is claimed is:

1. A process for making a sinterable superconductive composition in powder form having the formula $Bi_2CaSr_2Cu_2O_x$ where x is from about 7.5 to about 8.5 which comprises forming an admixture comprising an alkali metal chloride solvent material selected from the group consisting of sodium chloride and potassium chloride and mixtures thereof, and the oxide or oxide precursors of bismuth, calcium, strontium, and copper in amounts sufficient to form the composition by reaction, heating the admixture to a temperature sufficient to melt the alkali metal chloride, dissolve the oxides of bismuth, calcium, strontium and copper and form the superconductive composition, maintaining the temperature to continuously dissolve reactant oxides or oxide precursors until substantially consumed by formation and precipitation of the composition from the reactant-saturated solvent material; cooling the molten mass to a solid; separating and recovering the superconductive composition by dissolving the alkali metal chloride solvent material in water; and comminuting the superconductive composition to produce powder.

2. The process according to claim 1 in which the alkali chloride solvent material is an equimolar admixture of sodium chloride and potassium chloride and the temperature is from about 800° C. to about 850° C.

3. The process according to claim 2 in which comminuting is carried out by wet milling the superconductive composition in an organic liquid having a boiling point less than 100° C., recovering the resulting slurry, and drying it in a gaseous atmosphere at or below atmospheric pressure containing less than 100 parts per million of water, the dried powder having an average particle size of less than about 10 microns in the longest direction.

4. A process for making a sinterable superconductive composition in powder form having the formula $Bi_2CaSr_2Cu_2O_x$ where x is from about 7.5 to about 8.5 which comprises forming an admixture comprising calcium carbonate, strontium carbonate, and copper oxide; firing the admixture in air to form a combined calcium-strontium-copper oxide product; forming a second mixture comprising bismuth sesquioxide, the calcium-strontium-copper oxide product, and an alkali metal chloride solvent material selected from the group consisting of sodium chloride and potassium chloride and mixtures thereof, in amounts sufficient to form the superconductive composition by reaction; heating the admixture to a temperature sufficient to melt the alkali metal chloride, dissolve the oxides of bismuth, calcium, strontium and copper and form the superconductive composition; maintain the temperature continuously dissolving the reactants until the oxides are substantially consumed by formation and precipitation of the composition from the reactant saturated solvent; cooling the molten mass to a solid; separating and recovering the superconductive composition by dissolving the alkali metal chloride solvent material in water; and comminuting the superconductive composition to produce powder.

5. The process according to claim 4 in which comminuting is carried out by wet milling the superconductive composition in an organic liquid having a boiling point less than 100° C., recovering the resulting slurry and drying it in a gaseous atmosphere at or below atmospheric pressure containing less than 100 parts per million of water, the dried powder having an average particle size of less than about 10 microns in the longest direction.

* * * * *